June 28, 1932. H. I. MORRIS Re. 18,507

SWITCH MEANS

Original Filed May 2, 1927 2 Sheets-Sheet 1

INVENTOR.

HOWARD I. MORRIS,

BY Duell, Mann & Anderson

ATTORNEYS.

June 28, 1932. H. I. MORRIS Re. 18,507

SWITCH MEANS

Original Filed May 2, 1927 2 Sheets-Sheet 2

INVENTOR.
HOWARD I. MORRIS,
BY Dull, Dunn & Anderson.
ATTORNEYS.

Reissued June 28, 1932 Re. 18,507

UNITED STATES PATENT OFFICE

HOWARD I. MORRIS, OF LAKEWOOD, OHIO, ASSIGNOR TO THE YODER-MORRIS COMPANY, OF CLEVELAND, OHIO, A CORPORATION OF OHIO

SWITCH MEANS

Original No. 1,725,963, dated August 27, 1929, Serial No. 188,163, filed May 2, 1927. Application for reissue filed March 26, 1931. Serial No. 525,578.

This invention relates to mechanism adapted to be operated or controlled by the passage of a vehicle wheel over a switch means disposed in its path of movement, more particularly to an improved switch means, whereby an electric circuit for such mechanism is controlled.

One object of the invention is to provide an improved switch means in which the contact elements thereof are completely protected from the elements, water, condensation of moisture and electrical currents in the material forming the bed or surface or on which the switch means is positioned.

Another object of the invention is to provide an improved switch means having an improved mounting for its contact elements capable of preventing engagement of the latter except by the passing over the mounting of a relatively heavy weight.

Another object of the invention is to provide an improved switch mounting formed of a protecting material, whereby deterioration of the switch contacts and danger of short circuiting thereof due to condensation of moisture is substantially eliminated.

Another object of the invention is to mount the switch contacts in operative relation in a flexible insulation material which hermetically seals them and which permits their ready engagement.

Another object of the invention is to provide an improved switch means that is relatively simple and durable.

Another object of the invention is to provide an improved switch means which is readily installed and capable of positive operation at all times.

Other objects of the invention will be apparent to those skilled in the art to which my invention relates from the following description taken in connection with the accompanying drawings, wherein—

Figure 1:
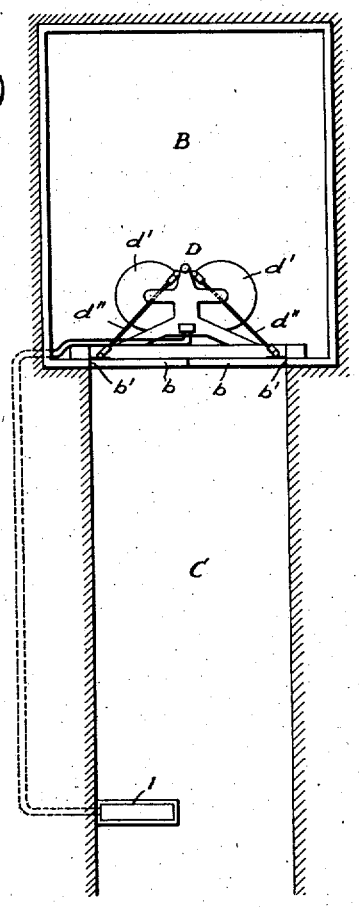
Fig. 1 is a view, partly in plan and partly diagrammatic, showing one application of my improved switch means to control a power operated mechanism.

My improved switch means, indicated as an entirety at 1, is adapted to be mounted in the path of a moving vehicle so that when one or more of its wheels 1′ pass over it, the weight thereof causes contact between a pair of contacts, designated 2, 3, in the drawings, to close an electrical circuit, A, which directly or indirectly effects operation of a suitable device or mechanism. The switch means may be mounted on the bed constituting the road or driving surface for the vehicle and anchored in position in any suitable manner or its casing may be embedded therein. It will be evident that my improved switch means may be employed for various purposes, for example, for controlling a circuit for signalling purposes, whereby a signal or an alarm is actuated at a distant point, as at a street intersection, or for lighting purposes. Another purpose for which it may be employed consists in operating a door opening and closing mechanism, this latter use of my invention being shown in Figs. 1 and 2.

Figure 2:
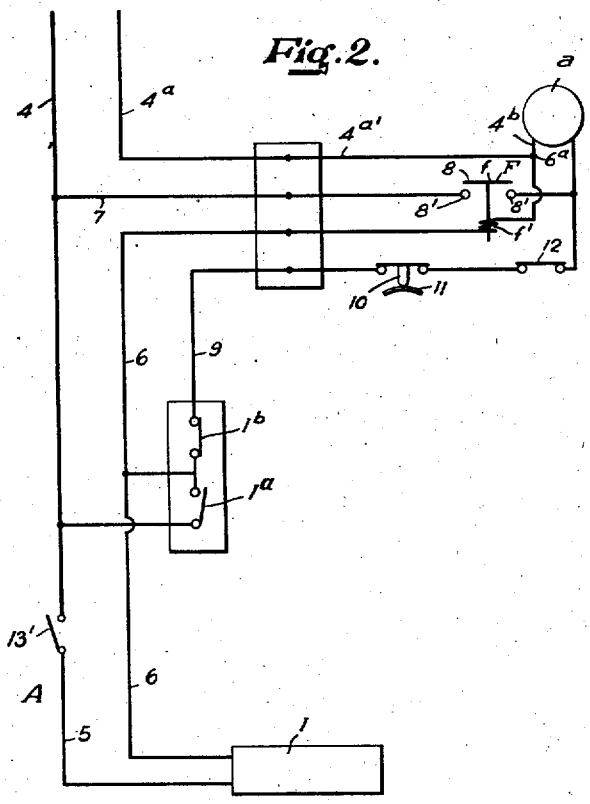
Fig. 2 is a diagram of the circuits for the switch means and mechanism shown in Fig. 1.
Figure 6:
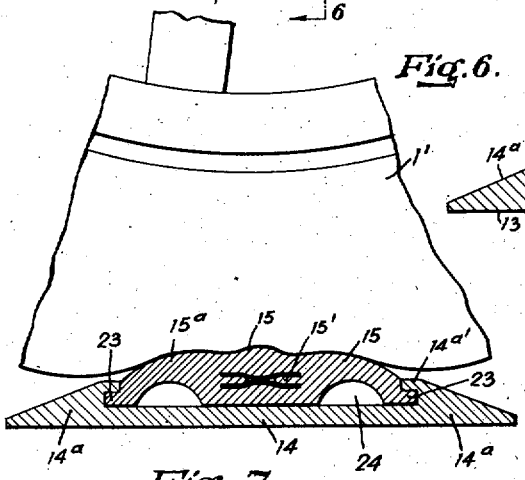
Fig. 6 is a section on the line 6—6 of Fig. 3 and showing the operation of the switch means when the wheel of a vehicle passes over it.

In Figs. 1 and 2, B indicates a garage having one or more doors *b*, preferably arranged to swing on hinges *b′*. C indicates a driveway leading to the garage and showing my improved switch means 1 associated with the driveway in position for one or more wheels 1′ of a vehicle to pass over it when moving in either direction. D indicates an operating mechanism, operated by an electric motor *d* (see Fig. 2) and having driven elements *d′* connected through links $d''$ with the doors $b$ to swing them open and to swing them closed each time the switch means operates or under the conditions hereinafter referred to. The operating mechanism D and circuits (hereinafter described) therefor, form the subject matter of a separate, co-pending application, Ser. No. 7,087, so that a detail description and illustration thereof will not be necessary. The circuit A is preferably arranged to operate a magnetic switch F which in turn closes a separate circiut to maintain the motor $d$ in operation, following which the circuit A opens, as will later appear. The circuit A is normally open, but is closed when the vehicle wheel 1′ passes over the switch means 1, as shown in Fig. 6. The circuit A consists of the electric supply main 4, a lead 5 connected with the main 4 and one of the switch contacts for example contact 2, and a lead 6 connected to the other contact (3), and an electric supply main 4$a$ and a lead 4$a'$ connected to the lead 6, at 6$a$; and also to one side of the motor $d$ by a lead 4$b$. For a purpose which will later appear, the coil $f'$ of the magnetic switch F is connected in series in the lead 6. 7 indicates a lead connected to the main 4 and connected through a switch 8 to the other side of the motor $d$. The switch 8 comprises a pair of contacts 8′, 8′ and the magnetic switch armature $f$ which makes contact with the contacts 8′ when the coil $f'$ of the magnetic switch F is energized. 9 indicates a lead connected to the lead 6 and the lead 7. Accordingly, it will be seen that when the switch means 1 is operated by the engagement of contacts 2, 3, (1) the motor circuit A is first established through leads 4$a$, 4$a'$, leads 4, 5, contacts 2, 3, and lead 6, (2) the motor circuit is established by the mains 4$a$, 4$a'$ and 4$b$ to one side of the motor; and (3) a shunt circuit is established by the lead 9 between the leads 6 and 7, which serves to maintain the armature coil $f'$ energized upon the disengagement of the contacts 2, 3. From the foregoing description it will be seen that upon the closing of the circuit A across the switch contacts 2, 3, the motor $d$ will be set in operation and continue to operate so long as the magnetic switch coil $f'$ remains energized, even if the contacts 2, 3, become disengaged, as is the case after the wheel 1′ passes over the switch means 1. 10 indicates a switch interposed in the lead 9 and normally closed. The switch 10 is actuated by a device 11 (such as a cam) on one of the moving parts (preferably one of the elements $d'$) of the mechanism D and positioned to operate the switch 10 to open the shunt circuit and deenergizes the coil $f'$ when the doors reach or approach their full open or full closed position. 12 indicates a normally closed switch interposed in the lead 9 in series with the switch 10 and opened automatically by a relatively movable element (not shown), which element is actuated when undue resistance to the movement of one or both doors $b$ results, as when either door meets with an obstruction.

As already set forth, the contacts 2, 3, of the switch means 1 are normally out of contact. When moved into engagement by the passage of a wheel or wheels 1′ over the switch means the circuit A will be closed with the result that the motor $d$ will be set in operation; likewise the shunt circuit will be closed substantially simultaneously so that upon the wheel or wheels 1′ rolling over beyond the switch means, the disengagement of the contacts thereof will not stop the motor $d$. The circuit A may be closed by any one of a plurality of switches (one being shown at 1$a$—Fig. 2) is connected in parallel with the leads 5—6. Once the shunt circuit is closed, the separate motor circuit across the contacts 8′—8′ will be maintained and the motor kept running until the shunt circuit is opened automatically by the switches 10 or 12 under the conditions already set forth, or manually by a normally closed switch 1$b$, also interposed in the shunt circuit.

Of the switch means 1, 13 indicates a support comprising a base 14 having thickened sides and ends to form upstanding walls 14$a$ cooperating to form a pocket or recess for a mounting 15 to be later referred to. 16 indicates a plurality of anchoring devices depending from the base 14 and adapted to be embedded in the bed of the surface, which in the illustrated application of my invention constitutes the driveway C. The anchoring devices may be of any desired shape and construction to form an interlock with materials of the bed. The devices 16 are preferably formed integral with base 14.

17 indicates a casing preferably disposed at one end of the base 14 and having its walls formed integral therewith. The casing is closed on all sides except its top, which registers with an opening 18 formed in the base 14. The casing 17 forms a chamber wherein the leads 2$a$, 3$a$, connected to the contacts 2, 3, respectively may be suitably connected or spliced to the ends of the leads 5, 6, the latter extending through a conduit 19 having its end mounted in an opening in one wall of the casing. The top of the casing may be closed by a cover 17$a$ fitted to a rabbeted portion in the base 14 and formed with openings for the leads 2$a$, 3$a$.

The contacts 2, 3, comprise strips of suitable conducting material extending longitudinally substantially from end to end of the mounting 15 and centrally thereof and by preference each strip is continuous from end to end. As will be understood, the contacts 2, 3, are embedded within the mounting 15 and the latter (with the leads 2$a$, 3$a$, connected to the contacts 2, 3, and leading therefrom) is cured or otherwise treated according to the character of the material of which it is formed, with the result that the contacts are hermetically sealed within the mounting.

Figure 5:
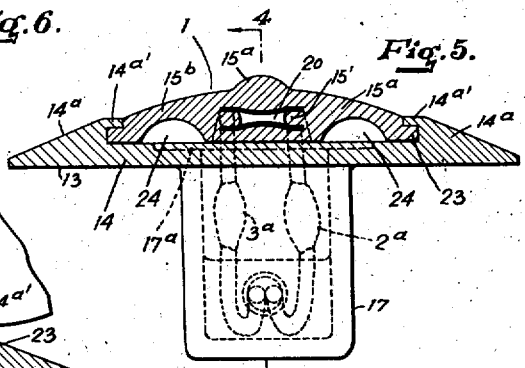
Fig. 5 is a section on the line 5—5 of Figs, 3 and 4.
Figure 7:
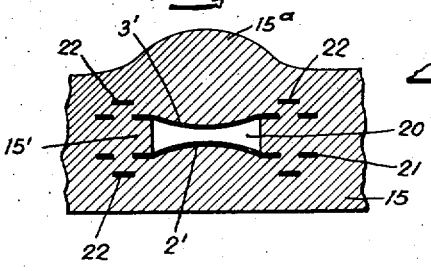
Fig. 7 is a fragmentary section, slightly enlarged on the line 5—5 of Figs. 3 and 4.
Figure 8:
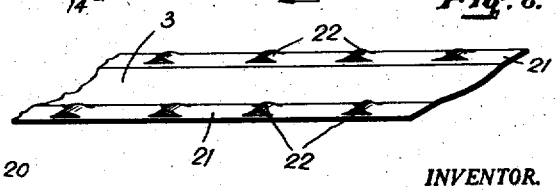
Fig. 8 is a perspective view of one of the switch contact elements.

The mounting is formed within its body portion with a cavity or chamber 20 substantially equal in length to the strips 2, 3, and the central longitudinal portions 2′, 3′, of the contact strips are disposed within the cavity, preferably against the upper and lower faces or walls thereof, and out of contact with each other. The lateral side portions 21 of each contact strip are held in spaced relation by cushioning means, which permits the central portion 2′, 3′, to make contact, one with the other, when the upper contact strip is depressed. In the present disclosure the cushioning means is provided by making the mounting of flexible material, preferably having resiliency, and embedding these lateral portions 21 in the material beyond the side walls of the cavity 20, so that when the portions 15′ of the material between the lateral portions 21 of the strips will maintain the central portions 2′, 3′ thereof in spaced relation, as clearly shown in Figs. 5 and 7, and permit of their contact one with the other, by the compression of these spacing portions 15′. The central portions 2′, 3′, of the strips 2, 3, are preferably of concavo-convex shape in cross section and the convex surfaces thereof are in opposed relation to more readily effect their contact to close the circuit A. Furthermore the lateral portions are provided with spaced upset sections or members 22, so that the material 15′ of the mounting 15 and metal of the portions 21 are interlocked to anchor the strips 2, 3, in aligned operative position and against creeping in any direction. By preference the strips 2, 3, are similar in construction and each formed of resilient material in order to more effectively cause their disengagement when pressure on the mounting 15 is relieved, and even in this form of construction only the upper contact 3 need be so formed; in the broader aspects of the invention the normal out of contact relation of the contacts 2, 3, may be provided by making the mounting 15 of resilient material such as rubber, or simply providing resilient means between the lateral portions 21 of the contacts.

The mounting 15 is preferably formed of rubber since such material embodies certain advantageous characteristics, to wit, it is relatively cheap and readily made; it has high insulation properties; it is impervious to water and therefore hermetically seals the cavity 20 and the contacts; so that condensation of moisture can not take place within the cavity 20 or upon the contacts 2, 3, to affect their functioning to close and break the circuit A; it may be made with sufficient resiliency to permit flexing of the contact 3 and its quick return to normal position after the relief of pressure on its upper surface; it may be readily shaped to effect yielding above the contacts; it is durable and lasting and its repeated compression does not affect its life and has little or no effect upon its resiliency.

The mounting 15 is removably mounted in the recess between the upstanding walls 14*a*, its sides and ends being interlocked therewith, such interlocking preferably being of a character which seals the joint between the mounting and walls 14*a* and forms between them a tighter joint as well as prevents distortion of the mounting or its displacement in the base when a vehicle wheel runs over it.

For these purposes the upstanding walls 14*a* are provided with inwardly extending flanges 14*a*′ which provide a space below them, and the sides of the mounting are provided along their lower portions with flanges 23 which fit into this space, these flanges forming an interlock between the mounting 15 and the side walls 14*a*.

The upper surface of the mounting 15 is preferably convex so that the central portion 15*a* above the contacts 2, 3, will be relatively thick to insure the movement of the upper contact 3 into engagement with the contact 2. To insure the bearing of the full weight of the wheel and its load on the central portion 15*a* of the mounting, those longitudinal portions 15*b* along either side of the central portion 15*a* are made to yield or flex more readily than the central portion 15*a*, so that they will not support the wheel and hence prevent compression of the central portion as the wheel passes over the mounting. For this purpose, the under side of the mounting 15 is formed with two longitudinally extending grooves 24, with the result that the thickness of the walls of the portions 15*a* will be reduced and the grooves form spaces to receive the portions 15*a* when compressed and thus reduces the tendency of distortion due to flattening out of the material under the weight of the wheel as would be the case if the portions 15*a* were solid between their upper and lower surfaces.

The switch means 1 may be used to close the circuit each time a wheel 1′ passes over it and hence when so operated, the doors *b*, if closed will swing open and if opened, the doors *b* will swing closed. The circuit A may be arranged so that the switch means 1 will operate to swing the doors in one direction only. This is accomplished by interposing in the lead 5 between the lead 9 and contact 3 a switch 13′ that is actuated by one of the doors *b*, as follows: If it is desired to have the switch means 1 close the circuit A and operate the doors to closed position when a car is driven out of the driveway C then this switch 13′ is opened by one of the doors when they are closed and the switch is closed when the doors are open. If it is desired to have the switch means 1 close the circuit A and operate the doors to opened position when a car is driven into the driveway C, then the switch 13′ is closed by one of the doors *b* when they close and the switch is open when the doors are open.

Figure 9:
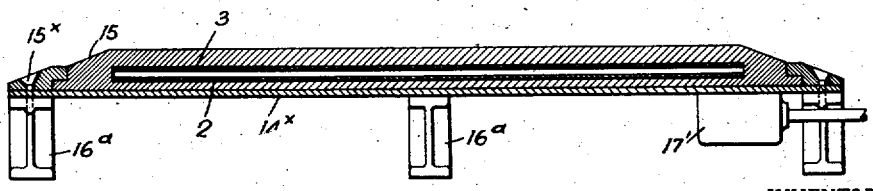
Fig. 9 is a longitudinal sectional view showing a slightly different form of construction.
Figure 4:
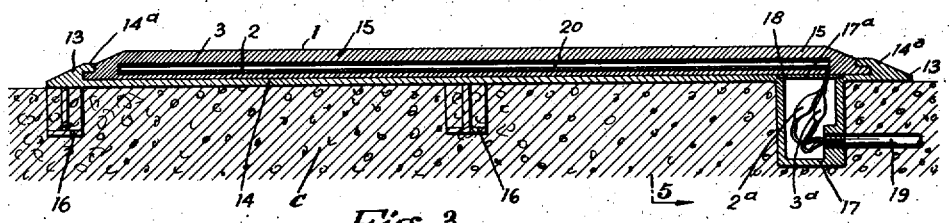
Fig. 4 is a section on the line 4—4 of Figs. 3 and 5.
Figure 3:
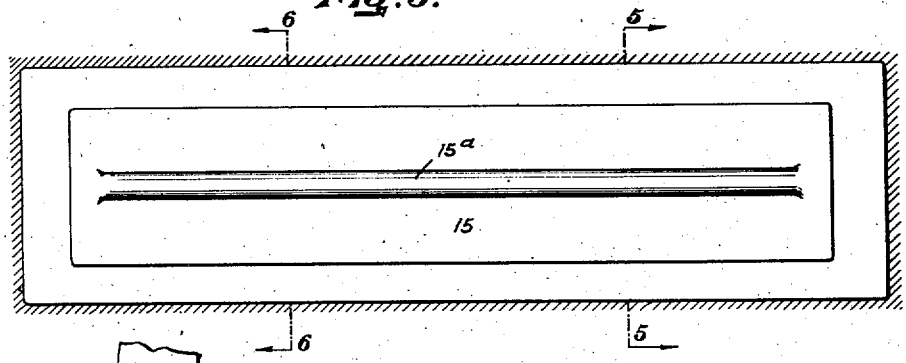
Fig. 3 is a plan view of the switch means shown mounted in the bed of a road or a drive way.

Fig. 9 shows a slightly modified form of construction wherein the base is simplified so that it may rest flat on the driveway, instead of being embedded therein and anchored by depending members 16*a*. In this form of construction, the base comprises a plate 14*x* of suitable sheet metal and a frame 15*x* having side and end members which form a recess for the mounting 15, the inner side walls of these members being similar in construction to corresponding walls of the embodiment shown in Figs. 3, 4, 5, and 6. The anchoring devices 16*a* and walls of the junction chamber 17′ are preferably formed integrally with the frame members and the plate 14*x* may be secured thereto in any suitable manner.

To those skilled in the art to which my invention relates, many changes in construction and widely differing applications and embodiments of my invention will suggest themselves without departing from the spirit and scope thereof. My disclosures and the description herein are purely illustrative and are not intended to be in any sense limiting.

Having described my invention, what I claim as new and desire to secure by Letters Patent, is:

1. A switch comprising a body of material, contacts having portions embedded in said material and portions in superposed relation arranged to contact one with the other when said body is compressed, means connected with said contacts to permit connection with an external circuit, and compressible means interposed between portions of said contacts and normally maintaining their contacting portions out of contact.

2. A switch comprising a body of protecting material, contacts having portions embedded in said material and portions in superposed relation arranged to contact one with the other when said body is compressed, means connected with said contacts to permit connection with an external circuit, and compressible means interposed between portions of said contacts and normally maintaining their contacting portions out of contact.

3. A switch comprising a body of insulation material, contacts having portions embedded in said material and portions in superposed relation arranged to contact one with the other when said body is compressed, means connected with said contacts to permit connection with an external circuit, and compressible means interposed between portions of said contacts and normally maintaining their contacting portions out of contact.

4. A switch comprising a body of flexible insulation material formed with an interior cavity and contacts having portions embedded in the material and portions in superposed relation in said cavity adapted to contact one with the other when said material is compressed, and means permitting their connection with an external circuit.

5. A switch comprising a body of flexible protecting insulation material formed with an interior cavity and contacts having portions embedded in the material and portions in superposed relation in said cavity adapted to contact with the other when said material is depressed, and means permitting their connection with an external circuit.

6. A switch comprising a body of flexible insulation material formed interiorly with a longitudinally extending closed cavity and strips of conducting material having portions within and extending substantially from end to end of said cavity in opposed relation and arranged to contact to close a circuit and portions embedded in said material in spaced relation and supporting said contacting portions normally out of contact, and means permitting their connection with an external circuit.

7. A switch comprising a body of flexible insulation material formed interiorly with a relatively long closed cavity, a pair of conducting strips within and extending longitudinally of said cavity in superposed relation and having their lateral portions embedded in said material in spaced relation whereby said strips are supported in spaced relation, and means permitting their connection with an external circuit.

8. A switch comprising a body of flexible insulation material formed interiorly with a relatively long closed cavity, a pair of conducting strips within and extending longitudinally of said cavity in superposed relation and having their lateral portions embedded in said material in spaced relation, whereby said strips are supported in spaced relation, means permitting their connection with an external circuit, and means for anchoring the lateral portions of said strips in said material.

9. A switch comprising a body of compressible, insulation material, a pair of contacts embedded within the interior of said body in superposed spaced relation to each other, the material between portions of said contacts being removed to permit their contact to close a circuit when said body is depressed and leads having portions embedded in said body and connected to said contacts.

10. In a switch, the combination of a support, a body of compressible material mounted on said support, a pair of contacts sealed within said body in superposed spaced relation to each other, and having portions disposed in opposed relation to permit their contact when said body is depressed, and leads having portions embedded in the material and connected to said contacts.

11. In a switch, the combination of a base having upstanding side walls, a body of compressible insulation material on said base fitting against said walls and a pair of contacts sealed within the said body in spaced relation to each other and having portions disposed in opposed relation to permit their contact when said body is depressed, said contacts having means permitting their connection with an external circuit.

12. In a switch, the combination of a support, a body of flexible insulation material on said support and having a thickened body portion extending longitudinally throughout its central portion to provide a central elevated portion on its upper surface, a pair of conducting strips disposed in superposed spaced relation and sealed within the interior of said body and having portions in opposed relation below the thickened portion of the body and arranged to contact when said elevated portions is depressed, and means permitting their connection with an external circuit.

13. In a switch, the combination of a base having upstanding side walls, a body of compressible insulation material on said base fitting against and having interlocking relation with said walls and a pair of contacts sealed within the said body in spaced relation to each other and having portions disposed in opposed relation to permit their contact when said body is depressed, said contacts having means permitting their connection with an external circuit.

14. In a switch, the combination of a body of insulating material, a pair of normally spaced contacts within said body, means connected to said contacts whereby they may be coupled to an external circuit, and the under side of said body being formed with at least one groove to one side of the center of said pair of contacts.

15. In a switch, the combination of a support, a body of compressible material mounted thereon, a pair of contacts sealed within said body in spaced relation to each other and having portions disposed in opposed relation to permit their contact when said body is displaced, leads having portions embedded in said body and connected to said contacts to permit connection with an external circuit and an anchoring device connected to said support.

16. In a switch, the combination of a support, a body of compressible material mounted thereon, a pair of contacts sealed within said body in spaced relation to each other and having portions disposed in opposed relation to permit their contact when said body is displaced, leads having portions embedded in said body and connected to said contacts to permit connection with an external circuit, and a plurality of depending members, one thereof serving as an anchoring device and the other comprising a casing into which said leads extend.

17. A switch comprising a body of resilient insulation material, a pair of contacts sealed therewithin having portions embedded in the material and normally held by the portion of the resilient material between them in spaced relation and portions in superposed relation arranged to contact one with the other when said material is depressed, and leads connected to said contacts and extending to a point outside said material.

18. A switch comprising a body of resilient rubber material, a pair of contacts sealed therewithin having portions embedded in the material and normally held by the portion of the resilient material between them in spaced relation and portions in superposed relation arranged to contact one with the other when said material is depressed and leads connected to said contacts and extending to a point outside said material.

19. A switch comprising a support having side walls, a body of flexible insulation material secured to said walls and formed with an interior cavity, contacts having portions in said cavity adapted to contact one with the other when said material is depressed and lateral portions embedded beyond the side walls of said cavity in said material and held in spaced relation thereby, and leads having portions embedded in said material and connected to said contacts.

20. A switch comprising a support having side and end walls, a body of flexible insulating material fitting said walls and formed with an interior cavity, contacts having portions in said cavity adapted to contact one with the other when said material is depressed and lateral portions embedded beyond the side walls of the cavity in said material and held in spaced relation thereby, means for anchoring said lateral portions in said material, and leads having portions embedded in said material and connected to said contacts.

21. A switch comprising a body of resilient material formed interiorly with a closed cavity disposed substantially midway between opposite edges of the body, the portions of the body at either side of the cavity being cut away, contact devices having portions embedded in said body in spaced relation and portions extending into said cavity for contact one with the other, and means for connecting said devices with an external circuit.

22. A switch comprising an elongated body of resilient material formed interiorly with a longitudinally extending closed cavity, contact strips enclosed in said cavity and having lateral portions embedded in the material in spaced relation and normally supporting the strips in said cavity out of contact, and a longitudinally extending recess formed in one surface of said body between said cavity and the adjacent longitudinal side edge of said body.

23. A switch comprising a body of insulating material and having a cavity, a pair of contact strips arranged within said cavity with their bodies and ends covered by said body of insulating material, leads extending from said strips to a point beyond said body, and means whereby said strips are normally maintained out of electrical contact with each other.

24. A switch to be arranged in a vehicle lane and to be traversed by vehicles moving over such lane, said switch comprising a pair of plates, means for normally maintaining the same out of electrical contact with each other, leads extending from said plates, a flexible body of insulating material covering said plates and presenting a cavity within which such plates are disposed.

25. A switch to be arranged in a vehicle lane and to be traversed by vehicles moving over such lane, said switch comprising a pair of relatively wide and lengthy plates at least one of which has resilient characteristics, means for normally maintaining the same out of electrical contact with each other, leads extending from said plates, and a flexible body of insulating material covering said plates and presenting a cavity within which such plates are disposed.

26. A switch to be arranged in a vehicle lane and to be automatically operated by traffic passing over the same, said switch including a relatively long resilient contactor plate, other contact means, insulating means arranged under said contactor plate and between said contactor plate and said other contact means for holding said contactor plate suspended over and spaced from said other contact means, said contactor plate being adapted to bend at any point along its length when pressure is applied and yieldingly contact with said other contact means at said point.

27. A switch to be arranged in a vehicle lane and to be automatically operated by traffic passing over the same, said switch including a relatively long resilient contactor plate, other contact means, insulating means arranged under said contactor plate and between said contactor plate and said other contact means for holding said contactor plate suspended over and spaced from said other contact means, said contactor plate being adapted to bend at any point along its length when pressure is applied and yieldingly contact with said other contact means, and a flexible body of insulating material covering said contactor plate at said point.

28. A switch to be arranged in a vehicle lane and to be automatically operated by traffic pasing over the same, said switch including a pair of relatively long contactor plates, at least one of said contactor plates being resilient, insulating means for holding said plates spaced and insulated from each other, said resilient contactor plate being adapted to bend at any point along its length when pressure is applied and yieldingly contact with said other contactor plate at said point.

29. A switch to be arranged in a vehicle lane and to be automatically operated by traffic passing over the same, said switch including a pair of relatively long contactor plates, at least one of said contactor plates being resilient, insulating means for holding said plates spaced and insulated from each other, said resilient contactor plate being adapted to bend at any point along its length when pressure is applied and yieldingly contact with said other contactor plate, and a flexible body of insulating material covering said contactor plates at said point.

In testimony whereof, I affix my signature.

HOWARD I. MORRIS.